N. C. DAVIS.
Corn Planter.
No. 104,280. Patented June 14, 1870.
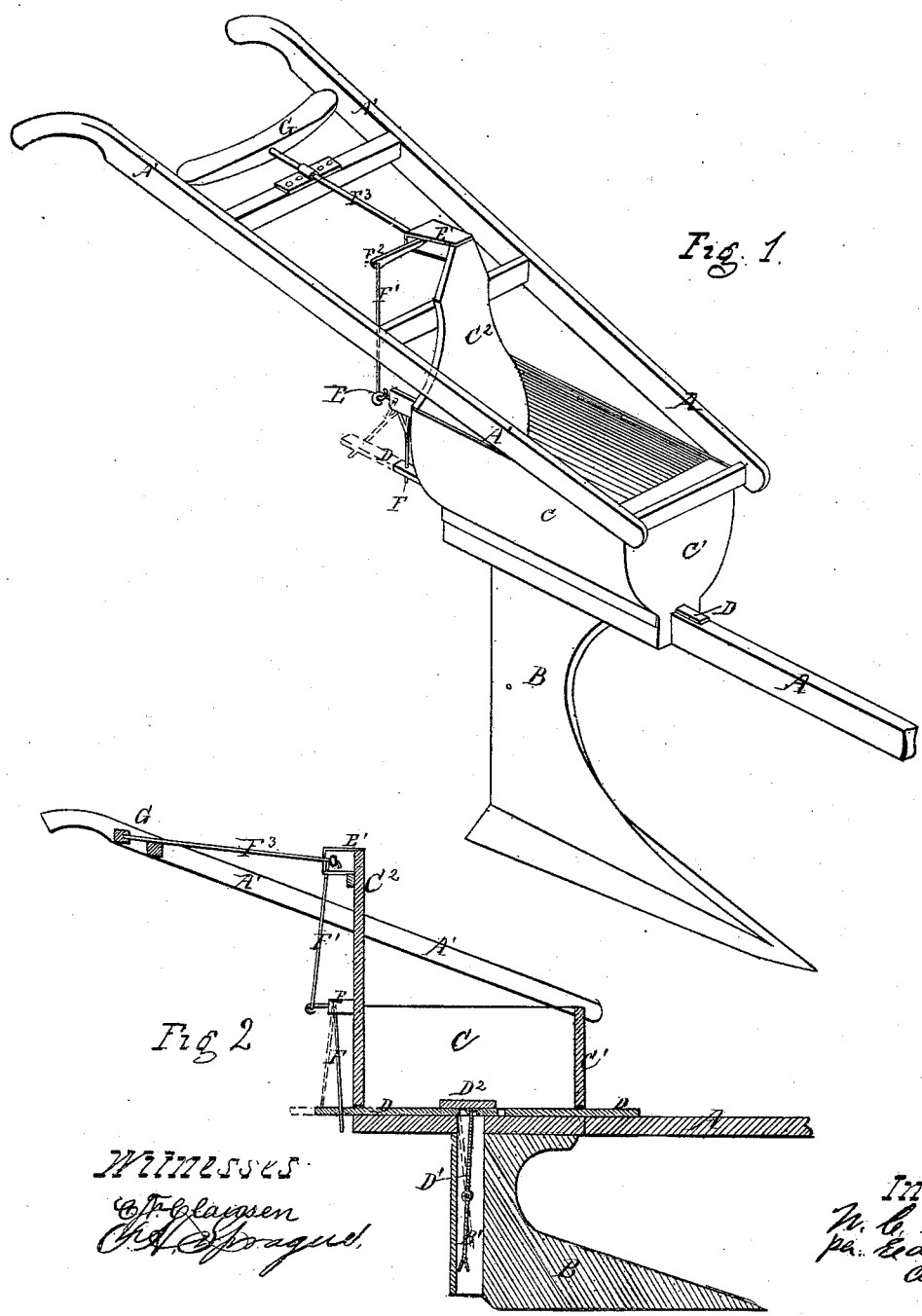

United States Patent Office.

NATHAN C. DAVIS, OF WORTHINGTON, OHIO, ASSIGNOR TO I. N. HOBILL, OF SAME PLACE.

Letters Patent No. 104,280, dated June 14, 1870.

IMPROVEMENT IN CORN-PLANTERS.

The Schedule referred to in these Letters Patent and making part of the same.

*To all whom it may concern:*

Be it known that I, NATHAN C. DAVIS, of Worthington, in the county of Franklin, in the State of Ohio, have invented a new and improved Corn-Planter; and I do hereby declare that the following is a full, clear and exact description thereof, reference being had to the accompanying drawing and to the letters of reference marked thereon.

Drawing.

Figure 1 is a perspective view of my improved cornplanter, showing the receptacle for the seed to be distributed, the shovel for forming the furrow, and devices for moving the destributing-rake or slide.

Figure 2 is a vertical sectional elevation, showing the arrangement of the seed-distributing slide, the passage through which the seed falls, and the pivoted guide within such passage.

Corresponding letters refer to corresponding parts in both figures.

This invention relates to that class of implements known as corn-planters; and

It consists in a new mode of operating the seed-slide, and in a seed-retainer, which is placed in the aperture through which the seed passes, and in the combination and arrangement of the parts of which the device, as a whole, is composed.

To enable others skilled in the art to make and use my invention, I will proceed to describe its construction and operation.

A, in the drawing, refers to the beam, which may be of any suitable length and size, it having the usual appliances at its front end for attaching it to the horse which draws it. Its width near its rear end is to be sufficient to admit of there being formed in it a passage for the seed to be dropped, as shown in fig. 2.

A' A' refer to the handles, which are of ordinary construction, and are to be arranged substantially as shown in fig. 1.

B refers to the shovel, which is to be of cast-iron or other suitable material, and is to be so constructed as to turn a furrow in both directions from its center. This shovel has a helve or standard projecting upward from its upper surface, which is supplied with a flange upon its upper end, for attaching it to the under side of the beam.

Through the rear portion of this helve or standard there is formed an aperture, B', as shown in fig. 2, through which the corn or other seed passes from the receptacle above into the drill formed by the shovel.

C refers to a receptacle, which is placed upon the beam A, so that its central portion shall come over the aperture through which the seed passes.

The ends $C^1$ and $C^2$ of this receptacle may be made of wood, or other suitable material, and be attached to the beam A in such a manner as to be sufficiently firm to hold the handles A' in position.

D refers to the slide or rake, which regulates the discharge of the corn from the receptacle C. It consists of a strip of wood, or other suitable material, which is somewhat less in width than the beam A upon which it moves, its length being sufficient to cause it to project beyond the ends of the receptacle C, as shown in fig. 2. Through this slide there are to be formed two apertures, of such diameter as will cause them to hold as many kernels of corn, or as many of any other seed, as it is desired to drop in one hill.

These apertures are to be at such a distance from each other that, when the slide is pushed forward to its greatest limit, its rear opening shall be over the aperture in the helve of the shovel, while its front opening shall be upon or over the beam, and ready to receive the seed to be dropped, upon its rearward movement, which brings such opening over said aperture, and the rear opening into position to receive its seed.

In order that no more seed may be dropped at one time than can be contained in the opening in the slide, a striker, $D^2$, is placed over such slide, where it is held by being secured to the beam, so that, as the slide or rake is moved back and forth, the surplus kernels are stricken off, and only the required number allowed to be carried over the aperture B'.

$D^1$ refers to a retainer, which is to be pivoted centrally in the aperture B', its upper end extending from the pivoted point up to and entering a groove in the under side of the slide D, while its lower end extends downward for about the same distance, it being forked at its extreme lower end, as shown in fig. 2. This retainer is moved, by the slide D, in such a manner that, as the seed passes down to the aperture B', it is caught and held by the lower end thereof, until the positions of the rake or slide and retainer are changed, when they are permitted to drop and be covered by the earth in the rear of the shovel.

E and E' refer to lugs or brackets, which are attached to the rear side of the receptacle C, for the purpose of holding in position a series of rods and a crank which moves the slide D.

F is a rod, the lower end of which passes through the rear end of slide D, its upper end being forked, so as to rest in the two arms of E, one of which ends is provided, as shown.

$F^1$ refers to a connecting-rod, which extends from the crank upon rod F to crank $F^2$, which is placed upon a shaft, $F^3$, which has its bearings in the bracket E', and in a cross-bar which extends from one handle to the other.

G refers to a handle or lever, which is attached to the outer end of shaft $F^3$, and is so arranged as to turn between the handles $A'$ $A'$, near the point where the operator grasps such handles, so that, with his thumbs, he may operate such handle or lever by pressing down the ends thereof, alternately, and thus operate the distributing-slide or rake and the retainer.

It will be seen that, as a consequence of the above-described arrangement, the hills may be placed at any desired distance from each other, and that the machine may be used for planting any kind of seed, by having slides prepared for the different kinds.

Having thus described my invention,

What I claim, and desire to secure by Letters Patent of the United States, is—

1. The combination of the shovel B, the retainer D', and the slide or rake D, constructed and operating as shown and described.

2. The combination and arrangement of the slide D, rods $F$ $F^1$ $F^2$, shaft $F^3$, and handle G, for operating the slide and retainer, constructed and operating as shown and described.

In testimony whereof I hereunto subscribe my name to this specification, this 22d day of Febuary, A. D. 1870, in the presence of two subscribing witnesses.

NATHAN C. DAVIS.

Witnesses:
W. F. GRISWOLD,
ELIAS LEWIS.